United States Patent [19]
Finkelstein et al.

[11] Patent Number: 5,410,602
[45] Date of Patent: Apr. 25, 1995

[54] METHOD FOR KEY MANAGEMENT OF POINT-TO-POINT COMMUNICATIONS

[75] Inventors: Louis D. Finkelstein, Wheeling; Daniel P. Brown, Elmhurst; Larry C. Puhl, Sleepy Hollow, all of Ill.

[73] Assignee: Motorola, Inc., Schaumburg, Ill.

[21] Appl. No.: 127,718

[22] Filed: Sep. 27, 1993

[51] Int. Cl.⁶ .............................................. H04L 9/00
[52] U.S. Cl. ........................................ 380/21; 380/28; 380/49
[58] Field of Search ....................... 380/21, 28, 29, 30, 380/49, 48

[56] References Cited
U.S. PATENT DOCUMENTS

| | | |
|---|---|---|
| 5,124,117 | 6/1992 | Tatebayashi et al. ................. 380/21 |
| 5,239,294 | 8/1993 | Flanders et al. . | |
| 5,301,247 | 4/1994 | Rasmussen et al. ................... 380/21 |

Primary Examiner—David C. Cain
Attorney, Agent, or Firm—Anthony G. Sitko

[57] ABSTRACT

A method of secure key distribution in a communication system having a plurality of subscriber units and an infrastructure communication center is provided. A first subscriber unit sends a request to the infrastructure communication center for a secure communication link with a second subscriber unit. This request includes an encrypted session encryption key which was encrypted with a first subscriber registration key. The infrastructure communication center decrypts the encrypted session encryption key with the first subscriber registration key. Subsequently, the infrastructure communication center re-encrypts the session encryption key with a second subscriber registration key. This re-encrypted session encryption key is sent to the second subscriber unit. In an alternative method, the first subscriber unit and the infrastructure communication center a priori know a session key. Therefore, the infrastructure communication center only needs to encrypt and send the session encryption key to the second subscriber unit, in response to a request by the first subscriber unit.

22 Claims, 2 Drawing Sheets

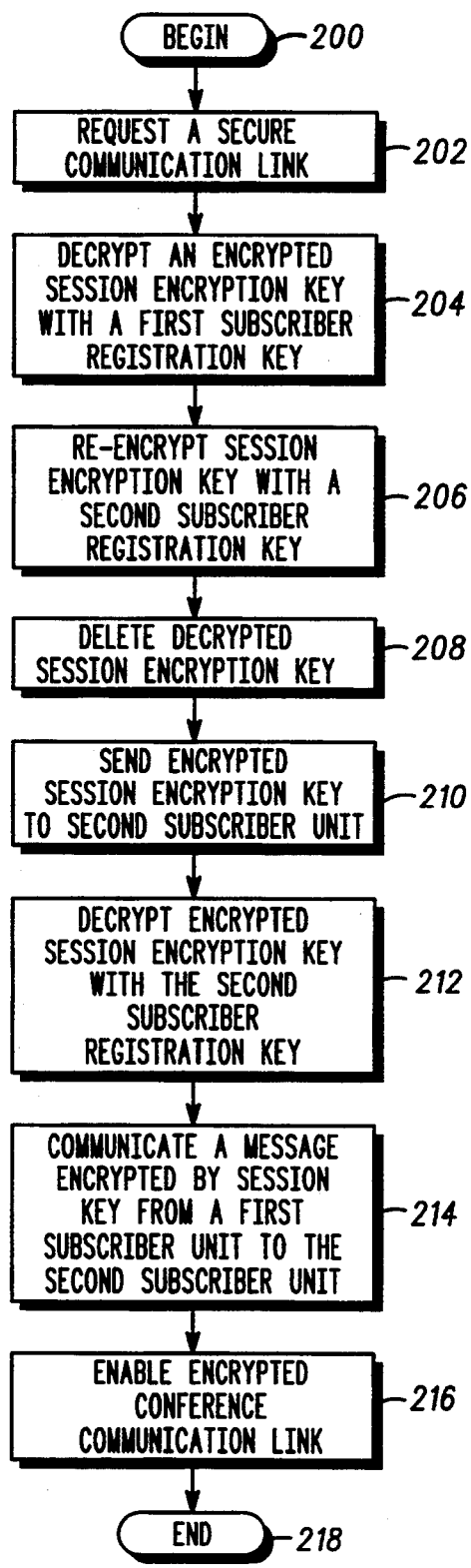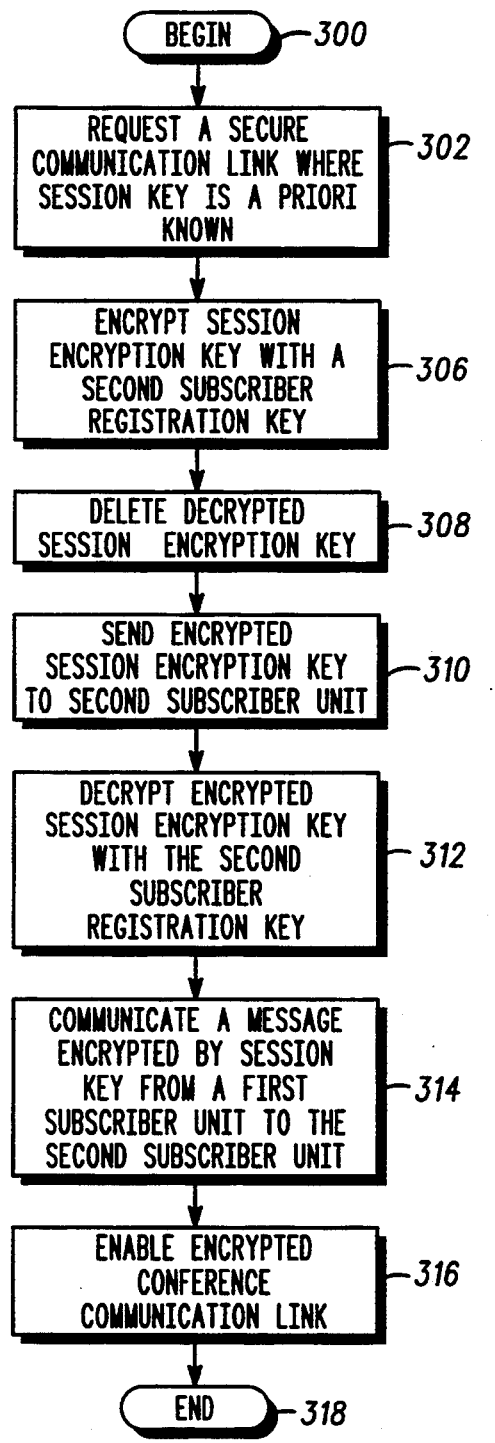

METHOD FOR KEY MANAGEMENT OF POINT-TO-POINT COMMUNICATIONS

RELATED INVENTIONS

The present invention is related to the following invention which is assigned to the assignee of the present invention. Method and Apparatus for Efficient Real-Time Authentication and Encryption in a Communication System by Brown et al. having U.S. Ser. No. 08/084,644, and filed on Jun. 28, 1993.

FIELD OF THE INVENTION

The present invention relates to communication systems and, more particularly, to encryption key management of point-to-point communications.

BACKGROUND OF THE INVENTION

Many communications systems currently use encryption to enhance security of the systems. These communication systems include cellular radio telephone communication system, personal communication systems, paging systems, as well as wireline and wireless data networks. By way of example a cellular communication system will be described below; however, it will be appreciated by those skilled in the art that the encryption techniques described can be readily extended to other communication systems without departing from the scope and spirit of the present invention. Turning now to cellular communication systems, these systems typically include subscriber units (such as mobile or portable units) which communicate with a fixed network communication unit via radio frequency (RF) communication links. A typical cellular communication system includes at least one base station (i.e., communication unit) and a switching center (i.e., an infrastructure communication center). Present cellular communication systems are designed to encrypt communications on an RF link between a subscriber unit and a base station unit through the use of an encryption key known to both units so that others who intercept the RF link communication link will be unable to listen to the communication (e.g., unable to eavesdrop on a voice conversation).

One such RF link encryption technique is described in the United States Digital Cellular (USDC) standard (known as IS-54 and IS-55) and published by the Electronic Industries Association (EIA), 2001 Eye Street, N.W., Washington, D.C. 20006. The USDC system encryption technique utilizes a series of specialized messages which must be passed between the subscriber unit and a base site communication unit before a session encryption key is known to both units. This encryption key is based upon shared secret data (SSD) in USDC system. For an authentication process an SSDA key is used. Similarly, for a voice privacy function an $SSD_B$ key is used. For the voice privacy function, the initial transmitted subscriber message contains an authentication response, but no other data is encrypted. The command to begin an encryption process is sent from the service provider (i.e., base site communication unit) to the subscriber after the subscriber has been assigned a traffic channel. Further, current system architecture design is focused on bringing encryption to data as well as voice. Data consists of either synchronous or packet data. Ideally, an encryption key should be provided for each data communication session. In a synchronous data environment, a session key is an encryption key which is used for the duration of a single (e.g., circuit switched) data communication (i.e., "call"). Similarly in a data packet environment, a session key is an encryption key which is used from the time that the communication unit registers with a serving system until the next time that the communication unit re-registers. In addition, in a previously-cited related invention entitled "Method and Apparatus for Efficient Real-Time Authentication and Encryption in a Communication System" by Brown et al. having U.S. Ser. No. 08/084,644, and filed on Jun. 28, 1993, another encryption key is proposed for USDC system which is termed an $SSD_C$ key and which is used for data packet encryption. In these communication systems, packetized data also needs to be encrypted. Packetized data adds an additional problem to the typical encryption process. This is because packets of data may arrive at different times at a subscriber unit of a communication unit (i.e., packet messages are "connectionless"). These packets need to be reassembled and decrypted in the same order in which they were encrypted. In addition, an encryption key can only be negotiated when a subscriber performs a registration. Therefore, a need exists for an encryption technique which can alleviate these problems associated with packetized data.

However, these previously known encryption techniques do not address all of the possible eavesdropping vulnerabilities inherent in a communication channel. Eavesdropping may still occur at other points in the communication channel between the subscriber unit and an endpoint target communication device such as through wiretapping of a land-line phone. Such a communication between a subscriber unit and an endpoint target communication device is termed a "point-to-point" communication. The communication may travel along several different physical communication links before being ultimately coupled via a communication link between the subscriber and target devices. For example in the cellular environment, a user of a subscriber unit may place a voice call to a target communication device located at a place of business. In order for that call to be completed, a communication channel must be set up on an RF link to a base site communication unit. In addition, the communication channel must be extended through the public switched telephone network (PSTN) to the place of business. This place of business may have a private telephone network connected to the PSTN. As a result, the communication channel may also need to be extended through the private network to ultimately connect with the target communication device. Currently, encryption techniques are only being applied to individual components of the entire communication channel (e.g., the RF link in USDC system may be encrypted). However, this leaves other components such as the PSTN or private network vulnerable to eavesdropping through wiretapping. Therefore, a need also exists for an encryption technique which can alleviate these problems associated with eavesdropping at other points of the communication channel.

SUMMARY OF THE INVENTION

These needs and others are substantially met through provision of a method of secure key distribution in a communication system having a plurality of subscriber units and an infrastructure communication center. A first subscriber unit sends a request to the infrastructure communication center for a secure communication link with a second subscriber unit. This request includes an encrypted session encryption key which was encrypted with a first subscriber registration key. The infrastructure communication center decrypts the encrypted session encryption key with the first subscriber registration key. Subsequently, the infrastructure communication center re-encrypts the session encryption key with a second subscriber registration key. This re-encrypted session encryption key is sent to the second subscriber unit. In an alternative method, the first subscriber unit and the infrastructure communication center a priori know a session key. Therefore, the infrastructure communication center only needs to encrypt and send the session encryption key to the second subscriber unit, in response to a request by the first subscriber unit.

BRIEF DESCRIPTION OF THE DRAWINGS

FIG. 2 is a flow chart of a preferred embodiment encryption method used by the first and the second subscriber unit over the infrastructure as shown in FIG. 1 in accordance with the present invention.

FIG. 3 is a flow chart of an alternative preferred embodiment encryption method used by the first and the second subscriber unit over the infrastructure as shown in FIG. 1 in accordance with the present invention.

DETAILED DESCRIPTION

Figure 1:
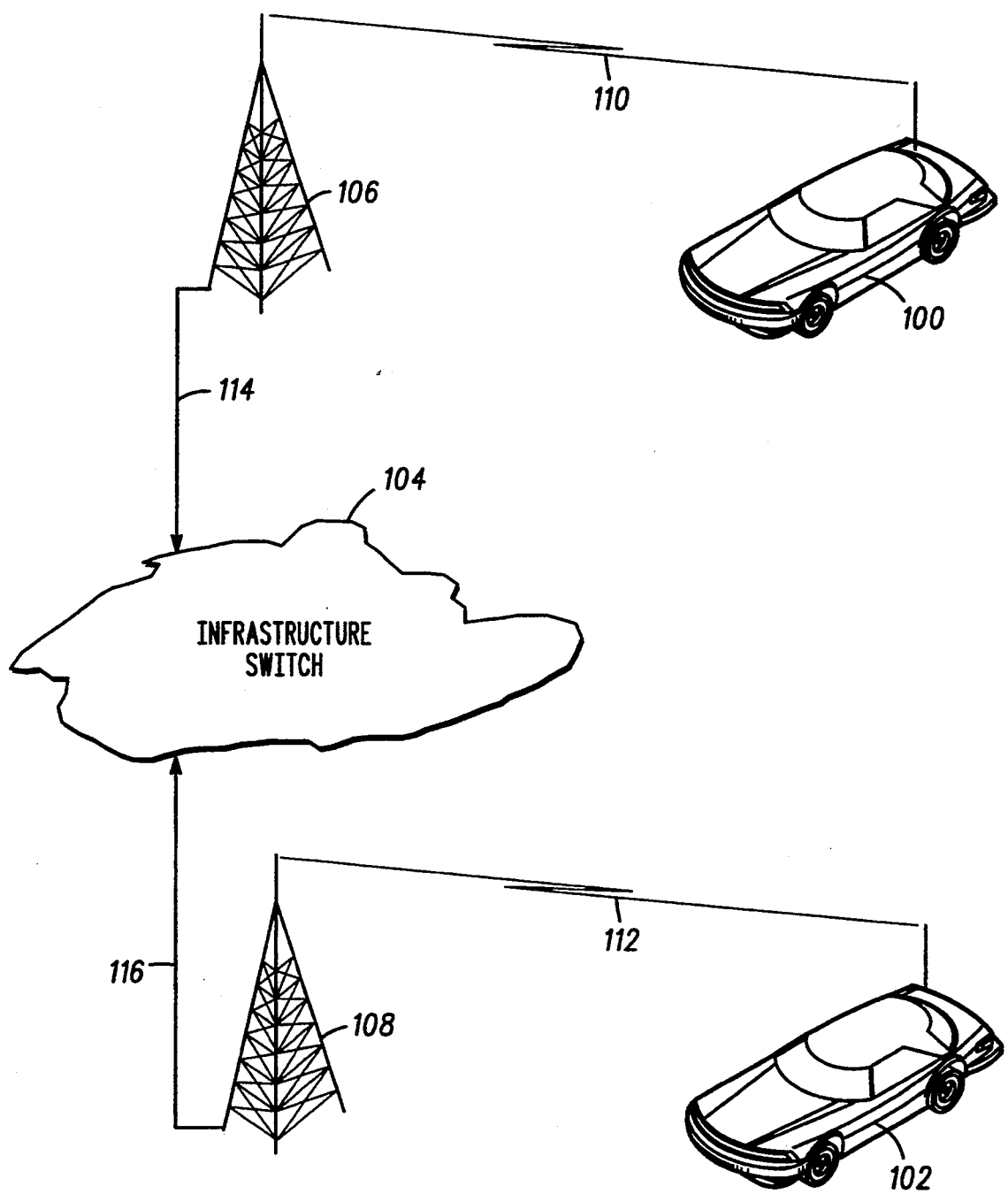
FIG. 1 is a block diagram showing a preferred embodiment communication system having a first and a second subscriber unit as well as an infrastructure connecting the subscriber units in accordance with the present invention.

FIG. 1 generally depicts a first 100 and a second 102 subscriber communication unit (e.g., a radiotelephone) as well as an infrastructure such as an infrastructure communication center or switch 104 and first 106 and second 108 cellular radio base sites. In the following example the subscriber units 100 and 102 are serviced by the same infrastructure switch 104. The first subscriber unit 100 forms a communication channel with the first base site 106 by an RF link 110. Similarly, the second subscriber unit 102 forms a communication channel to the second base site 108 by an RF link 112. In addition, the first base site 106 and the second base site 108 form communication channels to the infrastructure switch 104 by wirelines 114 and 116, respectively.

However, it will be appreciated by those skilled in the art that multiple switches (e.g., a cellular switch, a local PSTN switch, and/or a long distance carrier switch) could be used to connect the two subscriber units. In addition, the two subscriber units may be a part of two different cellular systems or one connected to a wirefine and one a part of a cellular system. Further, the subscriber units could be communicating data rather than voice over a communication channel such as through an Advanced Radio Data Information Service (i.e., ARDIS ® a joint venture between Motorola, Inc, and IBM) or a personal communication system (PCS) which is connected to the PSTN through a Mobile Network Integration (MNI) protocol without departing from the scope and spirit of the present invention.

Referring now to FIG. 2, a flow chart of a preferred embodiment "point-to-point" encryption scheme used by the first 100 and the second 102 subscriber unit over the infrastructure 104, 106, and 108 is shown. One of the most important elements of this preferred embodiment encryption scheme is the encryption key management in a "point-to-point" communication system. As is described in USDC system, each subscriber unit establishes a series of RF link encryption keys (e.g., $SSD_A$ and $SSD_B$ keys) upon registration with a cellular infrastructure network. These encryption keys, which are known to the subscriber unit and the cellular infrastructure network, are also known as registration keys. In addition as proposed by Brown et al., another encryption key, termed an $SSD_C$ key, may be generated by each subscriber unit for use in data encryption. This $SSD_C$ may also generate a session encryption key (SEK) which is valid for use during only one synchronous data communication session or one packet data registration session. The session encryption key (SEK) may be used to encrypt a "point-to-point" communication between the first 100 and the second 102 subscriber units such that the communication may even be encrypted as it passes through the infrastructure switch 104.

The overall security of a communication channel between the first 100 and the second 102 subscriber units depends upon the secure passing of a session key to both subscriber units. Flowchart elements 200 through 218 outline a preferred embodiment technique for securely passing these session encryption keys. A first subscriber unit 100 makes 202 a request to the infrastructure communication center 104 for a secure communication link with a second subscriber unit 102 via the RF link 110, first base site 106 and wireline 114. This request preferably includes a session encryption key (SEK) which has been encrypted with a first subscriber registration key ($SSD1_C$). The infrastructure communication center 104 decrypts 204 the encrypted session encryption key (SEK) with the first subscriber registration key ($SSD1_C$). Subsequently, the infrastructure communication center re-encrypts 206 the session encryption key (SEK) with a second subscriber registration key ($SSD2_C$). At this point the infrastructure communication center 104 no longer needs the decrypted session encryption key and may optionally delete 208 the session key from an infrastructure memory device which temporarily stored the session key. This deleting of the decrypted session key may enhance the overall security of the communication system by eliminating the possibility that someone could get unauthorized access to the session keys by tapping into the infrastructure communication center 104 storage memory. The infrastructure communication center 104 then sends 210 the encrypted session encryption key (SEK) to the second subscriber unit 102 via wireline 116, second base site 108 and RF link 112. The second subscriber unit 102 decrypts 212 the encrypted session encryption key (SEK) with the second subscriber registration key ($SSD2_C$). Finally, a message encrypted by the session encryption key (SEK) is communicated 214 between the first subscriber unit 100 and the second subscriber unit 102 transparently (i.e., without the decryption by the infrastructure) through the infrastructure communication center 104. This message may be decrypted by either subscriber unit 100 or 102 with the session encryption key (SEK).

This method of session key (SEK) management also works for broadcast messaging systems wherein the encrypted session key (SEK) may be sent in step 210 to a plurality of second subscriber units 102 such that broadcast messages may be encrypted by the session key (SEK).

In addition, an encrypted conference communication link may be enabled 216 by the infrastructure communication center 104 through one of two methods. This type of conference communication link is also known as a fractional-duplex mode of encrypted speech for conference applications. The first subscriber unit 100 would broadcast the session key (SEK) to the other parties in the conference call. Then once the session key (SEK) is established, a conversation can proceed whereby each talker can speak individually to all of the others. A smooth conversation flow requires that either an agreement exist between all participants concerning the order of the talkers (which is common on amateur radio nets), or that an automatic speech detector select the "talker" and route the "talker's" encrypted speech to the other subscriber units. Automatic speech detection and directional routing are common in speakerphone devices for conversations between two endpoints; however, through sophisticated automatic routers at infrastructure communication centers 104 it is possible to handle three or more endpoints at a time. One method for enabling automatic routing by the infrastructure communication center 104 involves decrypting subsequent communications from all of the subscriber units in the conference communication link with the decrypted session encryption key (SEK) which was previously stored in the memory of the infrastructure communication center 104. Another method for enabling automatic routing by the infrastructure communication center 104 involves participating subscriber units 100 and 102 providing communication activity information to the infrastructure communication center 104.

Referring now to FIG. 3, a flow chart of an alternative preferred embodiment "point-to-point" encryption scheme used by the first 100 and the second 102 subscriber unit over the infrastructure 104, 106, and 108 is shown. Flowchart elements 300 through 318 outline the alternative preferred embodiment technique for securely passing these session encryption keys. In this alternative preferred embodiment, the first subscriber unit 100 and the infrastructure communication center 104 a priori know (i.e., have previously determined) the value of the session key (SEK) through the subscriber unit registration process or some other way. Therefore, the first subscriber unit 100 makes 302 a request, without including the session encryption key (SEK), to the infrastructure communication center 104 for a secure communication link with a second subscriber unit 102 via the RF link 110, first base site 106 and wireline 114. Subsequently, the infrastructure communication center encrypts 306 the session encryption key (SEK) with a second subscriber registration key ($SSD2_C$). At this point the infrastructure communication center 104 no longer needs the decrypted session encryption key and may optionally delete 308 the session key from an infrastructure memory device which temporarily stored the session key. The infrastructure communication center 104 then sends 310 the encrypted session encryption key (SEK) to the second subscriber unit 102 via wireline 116, second base site 108 and RF link 112. The second subscriber unit 102 decrypts 312 the encrypted session encryption key (SEK) with the second subscriber registration key ($SSD2_C$). Finally, a message encrypted by the session encryption key (SEK) is communicated 314 between the first subscriber unit 100 and the second subscriber unit 102 transparently (i.e., without the decryption by the infrastructure) through the infrastructure communication center 104. This message may be decrypted by either subscriber unit 100 or 102 with the session encryption key (SEK). It will be appreciated by those skilled in the art that an encrypted conference communication link may be enabled 316 for this alternative preferred embodiment encryption scheme in a manner similar to the one previously described in reference to the preferred embodiment encryption scheme shown in FIG. 2.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the communication channel could alternatively be an electronic data bus, wireline, optical fiber link, satellite link, or any other type of communication channel.

What is claimed is:

1. A method of secure key distribution in a communication system having a plurality of subscriber units and an infrastructure communication center, comprising:
   (a) requesting, by a first subscriber unit to the infrastructure communication center, a secure communication link with a second subscriber unit, the request including an encrypted session encryption key, the session encryption key being encrypted with a first subscriber registration key;
   (b) decrypting, by the infrastructure communication center, the encrypted session encryption key with the first subscriber registration key;
   (c) re-encrypting, by the infrastructure communication center, the session encryption key with a second subscriber registration key; and
   (d) sending the encrypted session encryption key to the second subscriber unit.

2. The method of claim 1 further comprising the step of communicating a message encrypted by the session encryption key from the first subscriber unit to the second subscriber unit transparently through the infrastructure communication center.

3. The method of claim 1 further comprising the step of decrypting, by the second subscriber unit, the encrypted session encryption key with the second subscriber registration key.

4. The method of claim 1 wherein the sending step comprises sending the encrypted session encryption key to a plurality of second subscriber units.

5. The method of claim 1 further comprising the step of deleting, by the infrastructure communication center, the decrypted session encryption key from a memory device.

6. The method of claim 1 further comprising the step of enabling an encrypted conference communication link, by the infrastructure communication center, through decrypting subsequent communications from subscriber units with the decrypted session encryption key.

7. The method of claim 1 further comprising the step of enabling an encrypted conference communication link, by participating subscriber units, through providing communication activity information to the infrastructure communication center.

8. A method of secure key distribution in a communication system having a plurality of subscriber units and an infrastructure communication center, comprising:

(a) requesting, by a first subscriber unit to the infrastructure communication center, a secure communication link with a second subscriber unit, the request including an encrypted session encryption key, the session encryption key being encrypted with a first subscriber registration key;

(b) decrypting, by the infrastructure communication center, the encrypted session encryption key with the first subscriber registration key;

(c) re-encrypting, by the infrastructure communication center, the session encryption key with a second subscriber registration key;

(d) deleting, by the infrastructure communication center, the decrypted session encryption key from a memory device;

(e) sending the encrypted session encryption key to the second subscriber unit;

(f) decrypting, by the second subscriber unit, the encrypted session encryption key with the second subscriber registration key; and (g) communicating a message encrypted by the session encryption key from the first subscriber unit to the second subscriber unit transparently through the infrastructure communication center.

9. The method of claim 8 wherein the sending step comprises sending the encrypted session encryption key to a plurality of second subscriber units.

10. The method of claim 8 further comprising the step of enabling an encrypted conference communication link, by the infrastructure communication center, through decrypting subsequent communications from subscriber units with the decrypted session encryption key.

11. The method of claim 8 further comprising the step of enabling an encrypted conference communication link, by participating subscriber units, through providing communication activity information to the infrastructure communication center.

12. A method of secure key distribution in a communication system having a plurality of subscriber units and an infrastructure communication center, comprising:

(a) requesting, by a first subscriber unit to the infrastructure communication center, a secure communication link with a second subscriber unit, the first subscriber unit and the infrastructure communication center a priori knowing a session key;

(b) encrypting, by the infrastructure communication center, the session encryption key with a second subscriber registration key; and (c) sending tire encrypted session encryption key to the second subscriber unit.

13. The method of claim 12 further comprising the step of communicating a message encrypted by the session encryption key from the first subscriber unit to the second subscriber unit transparently through the infrastructure communication center.

14. The method of claim 12 further comprising the step of decrypting, by the second subscriber unit, the encrypted session encryption key with the second subscriber registration key.

15. The method of claim 12 wherein the sending step comprises sending the encrypted session encryption key to a plurality of second subscriber units.

16. The method of claim 12 further comprising the step of deleting, by the infrastructure communication center, the decrypted session encryption key from a memory device.

17. The method of claim 12 further comprising the step of enabling an encrypted conference communication link, by the infrastructure communication center, through decrypting subsequent communications from subscriber units with the decrypted session encryption key.

18. The method of claim 12 further comprising the step of enabling an encrypted conference communication link, by participating subscriber units, through providing communication activity information to the infrastructure communication center.

19. A method of secure key distribution in a communication system having a plurality of subscriber units and an infrastructure communication center, comprising:

(a) requesting, by a first subscriber unit to the infrastructure communication center, a secure communication link with a second subscriber unit, the first subscriber unit and the infrastructure communication center a priori knowing a session key;

(b) encrypting, by the infrastructure communication center, the session encryption key with a second subscriber registration key;

(c) deleting, by the infrastructure communication center, the decrypted session encryption key from a memory device;

(d) sending the encrypted session encryption key to the second subscriber unit;

(e) decrypting, by the second subscriber unit, the encrypted session encryption key with the second subscriber registration key; and (f) communicating a message encrypted by the session encryption key from the first subscriber unit to the second subscriber unit transparently through the infrastructure communication center.

20. The method of claim 19 wherein the sending step comprises sending the encrypted session encryption key to a plurality of second subscriber units.

21. The method of claim 19 further comprising the step of enabling an encrypted conference communication link, by the infrastructure communication center, through decrypting subsequent communications from subscriber units with the decrypted session encryption key.

22. The method of claim 19 further comprising the step of enabling an encrypted conference communication link, by participating subscriber units, through providing communication activity information to the infrastructure communication center.

* * * * *